Jan. 9, 1951  W. M. YOST  2,537,113
MULTIPLE PULSE GENERATOR
Filed March 6, 1945
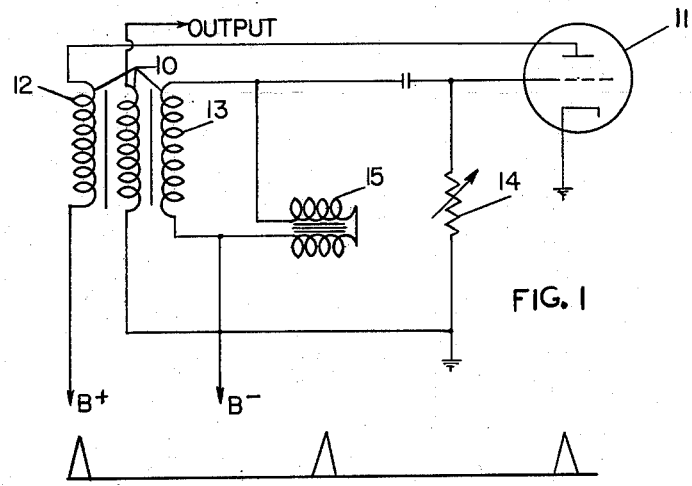
FIG. 1
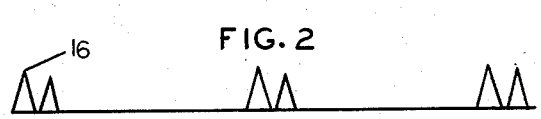
FIG. 2
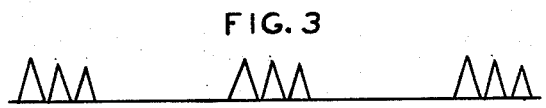
FIG. 3
FIG. 4
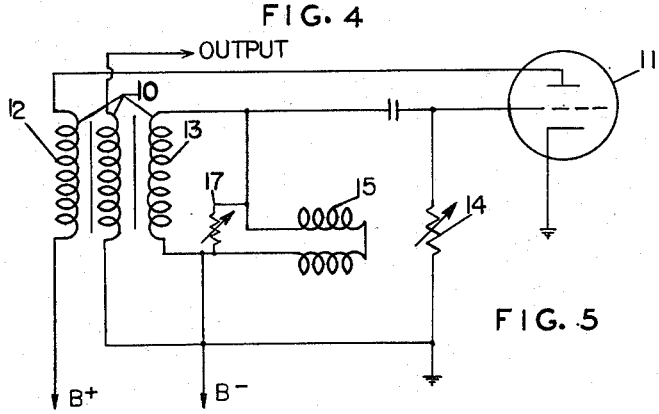
FIG. 5
*INVENTOR.*
WILLIAM M. YOST
BY
*William D. Hall.*
ATTORNEY Patented Jan. 9, 1951

2,537,113

UNITED STATES PATENT OFFICE 2,537,113

MULTIPLE PULSE GENERATOR

William M. Yost, Dayton, Ohio

Application March 6, 1945, Serial No. 581,266

4 Claims. (Cl. 250—36)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates to multiple pulse generators.

Interrogator-responsor-transpondor systems employ a single pulse in their train of pulse repetition frequencies and can be triggered into signal generation by noise, by propeller modulation frequencies, by ignition noise from airplane or vehicle engines or by ground equipment. Such systems are also easily jammed by enemy jamming equipment. With the novel system of paired or grouped pulse generation herein disclosed, however, intentional or non-intentional jamming or triggering of such systems is almost completely eliminated. Accordingly, the novel system hereinafter described, employs a blocking grid oscillator circuit for generation of multiple pulses, and the pairing or grouping of pulses is accomplished by a delay device inserted in the grid circuit of the pulse generating oscillator for spacing the pairs or groups of pulses between their regular pulse repetition frequency. A variable grid leak resistor is employed in the generator grid circuit for adjusting the basic pulse repetition frequency.

In a pair of pulses of a pulse repetition frequency train, the first pulse may be employed to initiate the sweep of a pulse radar navigational system, and that same pulse together with the second of the pair of pulses may be used to trigger a beacon transpondor so as to furnish the range of the interrogator from the beacon transpondor. A radar navigational system will be found fully described in the co-pending application of Kenneth W. Nightenhelser entitled "Homing System," Serial No. 553,859, filed September 13, 1944, and this system of multiple pulse generation is an improvement in the pulse system there employed whereby the transpondor beacon cannot accidentally or otherwise be triggered than by the desired interrogator aircraft which is seeking to determine its range and position with respect to said beacon transpondor.

This device is flexible to an unusual degree in that within reasonable limits any number of pulses may be generated between the succeeding pulse repetition group. That is, the multiple group may ordinarily be from two to six and by adjusting the threshold of the next succeeding tube which is triggered by the group of pulses or by the insertion of proper attenuation, the system can be made to operate with two or three or four or five or six pulses depending on the utilization of the circuit.

An object of the invention is to provide a delay circuit in a pulse generating oscillator commonly referred to as a blocking grid oscillator, to obtain pairs or groups of pulses to replace the single pulse in Interrogator Friend or Foe radar transmitters and receivers for security purposes.

Another object is to generate a pair or group of pulses of a regular pulse repetition frequency of said pairs or groups of pulses so that each pulse member of its group may be used to effect different results in a radar system.

Other objects and features of novelty will be apparent from the following description and the annexed drawings, it being clearly understood, however, that the invention is not limited in any way by such description and drawings, or otherwise than by the appended claims.

Referring to the drawings, in which similar reference numerals refer to like parts;

Figure 1 is a schematic diagram of the pulse generating circuit with an iron core transformer in the delay line to increase the delay with a smaller size delay line;

Figure 2 is a diagram of the wave shape form of the ordinary single pulse repetition frequency derived from ordinary blocking grid oscillators;

Figure 3 is a diagram of the same basic pulse repetition frequency illustrated in Figure 2 and showing the multiple pulse generation derived from this novel circuit, a pair of multiple pulses being shown therein;

Figure 4 is similar to the multiple pulse derivation shown in Figure 3 wherein a group of three multiple pulses may be obtained; and Figure 5 is a circuit diagram illustrating the application of a variable resistance across a delay line so that the desired number of pulses in the group may be obtained, and utilizing an air core transformer in the delay line to practically eliminate distortion, an essential factor in gating applications.

This invention is utilized to modulate the various systems hereinbefore described by putting out paired or groups of pulses. A pulse transformer 10, having its primary winding 12 in the plate circuit of triode tube 11 and its secondary winding 13 in the grid circuit of triode tube 11, together with said tube 11 comprise a blocking grid oscillator. A blocking grid oscillator is one which oscillates for one cycle only so that at the end of one cycle its associated tube 11 is cut-off. When a plate voltage is applied to tube 11, a flow of current occurs through plate winding 12 of transformer 10 inducing a voltage of opposite polarity in grid winding 13 in such a manner as to apply a negative voltage on the grid of tube 11 to cut off said tube when plate current saturation is achieved. This negative voltage on the grid of tube 11 is allowed to leak off through variable resistor 14 thereby determining the frequency or repetition rate of the blocking oscillator, until tube 11 fires again. The output of tube 11 during the cycle when tube 11 fires is shown in Figure 2. When the negative voltage has leaked off through resistor 14, the next succeeding pulse from the pulse voltage source will cause tube 11 to fire again, and the cycle is repeated.

In order to furnish the multiple wave form illustrated in Figure 3, a delay line 15 is connected across grid winding 13 of transformer 10. The negative voltage from grid winding 13 which is fed to the grid of tube 11 is simultaneously fed to delay line 15. Delay line 15 is a shorted type of line so that when the negative voltage from grid winding 13 cuts tube 11 to non-conductance, the reflected pulse from delay line 15, now of positive polarity due to phase inversion through said delay line 15, is applied to the grid of tube 11 which fires for the second time. The time interval required for exciting the grid of tube 11 for firing the tube is determined by the delay furnished by delay line 15 and the result is the desired paired pulse 16. When the negative voltage from grid winding 13 builds up across the grid of tube 11, current stops flowing and the tube is cut-off until the next cycle fires tube 11 after the negative voltage on its grid has leaked-off through resistor 14.

Delay line 15 will set up a train of oscillations dying down to zero and each positive half of each oscillation would ordinarily trigger tube 11. In order, therefore, that only the desired number of pulses of the train of pulses set up by the oscillations of delay line 15 be of sufficient amplitude to trigger tube 11, an attenuating variable resistor 17 is placed across delay line 15, introducing a variable attenuation of the initial pulse of the train of pulses by lowering the Q of the delay line, limiting the oscillations to the desired number of positive half cycles to trigger tube 11. The spacing between pulses in each pair of pulses 16 is determined by the length or delay characteristic of delay line 15.

Having thus described my invention, I claim:

1. A pulse generator comprising a space discharge device having at least a cathode having a reference potential, an anode, and a control electrode, a transformer having a plurality of windings, means for applying a voltage positive with respect to the cathode potential to said anode through a first winding of said transformer for producing an anode current, a capacitor, a second winding of said transformer regeneratively connected to said control electrode through said capacitor for impressing upon said control electrode a voltage with respect to said cathode potential determined by the rate of change of said anode current, a grid leak resistor connected between said control electrode and said cathode, said capacitor and resistor forming a circuit having a given time constant, said discharge device being effective in producing a series of periodic output pulses having a periodicity determined by said given time constant; a phase inverting delay line shunting said resistance and capacitance, said delay line having a time delay characteristic which is small relative to the period of said series of output pulses and having a given attenuation characteristic, whereby each pulse in said series is effective in producing one or more secondary pulses, the period between successive ones of said secondary pulses being equal to the time delay of said delay line and the number of said secondary pulses being determined at least by said given attenuation characteristic.

2. A pulse generator according to claim 1 wherein said transformer has a third winding for coupling said generator to pulse utilization means.

3. A pulse generator according to claim 1 further including means for adjusting the attenuation characteristic of said delay line, whereby the number of secondary pulses may be varied.

4. A pulse generator comprising a blocking oscillator for producing a periodic series of output pulses, said blocking oscillator including a resistance-capacitance network having a given time constant for determining the period between pulses of said series; and a phase inverting delay line shunting said resistance-capacitance network, said delay line having a time delay characteristic which is small relative to the period of said output pulses and having a given attenuation characteristic, whereby each of said output pulses is effective in producing one or more secondary pulses, the period between successive ones of said secondary pulses being equal to the time delay of said delay line and the number of secondary pulses in each group being determined at least by said given attenuation characteristic.

WILLIAM M. YOST.

REFERENCES CITED

The following references are of record in the file of this patent:

UNITED STATES PATENTS

| Number | Name | Date |
|---|---|---|
| 2,188,970 | Wilson | Feb. 6, 1940 |
| 2,212,173 | Wheeler | Aug. 20, 1940 |
| 2,212,420 | Harnett | Aug. 20, 1940 |
| 2,444,782 | Lord | July 6, 1948 |
| 2,447,082 | Miller | Aug. 17, 1948 |
| 2,457,522 | Bias et al. | Dec. 28, 1948 |